United States Patent
Furuichi et al.

(10) Patent No.: US 8,195,895 B2
(45) Date of Patent: Jun. 5, 2012

(54) SHARED OBJECT CONTROL FOR CONTROLLING INFORMATION READ/WRITE PROCESSING

(75) Inventors: Sanehiro Furuichi, Kanagawa-ken (JP); Atsumi Ikebe, Kanagawa-ken (JP); Yasuhide Niimura, Kanagawa-ken (JP); Masami Tada, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 12/472,956

(22) Filed: May 27, 2009

(65) Prior Publication Data
US 2009/0327617 A1 Dec. 31, 2009

(30) Foreign Application Priority Data
Jun. 30, 2008 (JP) ................................. 2008-170858

(51) Int. Cl.
*G06F 13/00* (2006.01)
(52) U.S. Cl. .................... 711/148; 711/221; 711/147
(58) Field of Classification Search .................. 711/148, 711/221, 147
See application file for complete search history.

(56) References Cited

U.S. PATENT DOCUMENTS

| 5,270,877 | A * | 12/1993 | Fukushima et al. | 360/48 |
| 7,006,416 | B1 * | 2/2006 | Ohgake | 369/53.2 |
| 7,549,171 | B2 * | 6/2009 | Kano | 726/27 |
| 7,657,727 | B2 * | 2/2010 | Ito et al. | 711/221 |

FOREIGN PATENT DOCUMENTS

| JP | 200010929 A | 10/2000 |
| JP | 2006211118 A | 8/2006 |
| JP | 2006276093 A | 10/2006 |
| JP | 2007249304 A | 9/2007 |
| JP | 2008027322 A | 2/2008 |
| JP | 200833582 A | 10/2008 |

OTHER PUBLICATIONS

Furuichi, Sanehiro; Katsuno, Yasuharu; Kudo, Michiharu; Watanabe, Yuji; "Chinese-wall Process Confinement for Application Level Distribution Secure Group;" DICOMO Proceedings, 2007.

* cited by examiner

*Primary Examiner* — Connie Yoha
(74) *Attorney, Agent, or Firm* — D'Ambrosio & Menon PLLC; Usha Menon; Srikant Viswanadham

(57) ABSTRACT

Methods, systems, and computer program products for controlling information read/write processing. The method includes assigning a plurality of division areas to a shared storage area for storing a shared object: specifying a division area used for read/write processing in accordance with user identification information for identifying a user; and executing the read processing for reading information from a specified division area and the write processing for writing information to the specified division area. The shared object is shared among a plurality of processes.

11 Claims, 11 Drawing Sheets

SHARED OBJECT CONTROL FOR CONTROLLING INFORMATION READ/WRITE PROCESSING

PRIORITY

This application is based on and claims the benefit of priority from Japanese Patent Application No. 2008-170858, filed Jun. 30, 2008.

BACKGROUND

In recent years, opportunities to exchange data between plural programs have increased, leading to various security issues such as leakage of confidential information. Of particular interest is the risk of information leakage between plural programs in the same computer.

The risk of information leakage upon data exchange between computers can be reduced using a security function. However, it is difficult to enhance security for a shared object accessible from plural programs in the same computer, so that the other programs on the same computer can easily read/write data from/to the shared object.

SUMMARY

Methods, systems, and computer program products are disclosed for controlling information read/write processing through a shared object that is shared among a plurality of processes. One embodiment is a method including assigning a plurality of division areas to a shared storage area for storing a shared object that is shared among a plurality of processes; specifying one of the plurality of division areas used for read/write processing in accordance with user identification information for identifying a user; and executing processing of at least one processing type selected from the group consisting of read processing for reading information from a specified division area and write processing for writing information to the specified division area.

One embodiment is a computer program product disposed on a computer-readable medium for controlling information read/write processing through a shared object that is shared among a plurality of processes. The computer program product includes computer program instructions for assigning a plurality of division areas to a shared storage area for storing a shared object that is shared among a plurality of processes; specifying one of the plurality of division areas used for read/write processing in accordance with user identification information for identifying a user; and executing processing of at least one processing type selected from the group consisting of read processing for reading information from a specified division area and write processing for writing information to the specified division area.

According to another embodiment of the present invention, in the computer program product, a storage area management table for storing pointer information for each of the division areas in association with user identification information is provided, and if a user issues an instruction to execute read processing or write processing through a shared object, pointer information is extracted with reference to the storage area management table with user identification information of the user being used as key information. Address information representing a target of read processing or write processing is converted into the extracted pointer information.

According to another embodiment of the present invention, the computer program product assigns a plurality of division areas in accordance with security level information, stores specific encryption key information in accordance with the security level information, specifies security level information based on the extracted pointer information, and encodes information to be written or decodes read information using encryption key information corresponding to specified security level information. Common security level information may be used for a set of a plurality of user identification information. The shared object may be a temporary storage area of information shared among a plurality of applications.

According to another embodiment of the present invention, a computer program product assigns a plurality of division areas to the temporary storage area in accordance with security level information, and stores pointer information for each of the division areas and encryption key information in association with user identification information and security level information. If a user issues an instruction to execute read processing or write processing through the temporary storage area, pointer information is extracted with reference to the storage area management table with user identification information of the user being used as key information. Address information representing a target of read processing or write processing is converted into the extracted pointer information. Security level information is specified based on the extracted pointer information. Information to be written is encoded or read information is decoded using encryption key information corresponding to specified security level information. Read processing for reading information from the division areas and write processing for writing information to the division areas are executed based on the converted address information.

Division areas as a target of read/write processing are specified in accordance with user identification information to thereby assign a shared object to division areas that permit a predetermined user to read write data thereto/therefrom to execute information read/write processing through the shared object. In this way, a shared object can be used at any address different from the standard address without loss of functionality.

One embodiment is a shared object control system for controlling information read/write processing. The system includes a processor and a computer memory operatively coupled to the processor. The computer memory has disposed within it computer program instructions for assigning a plurality of division areas to a shared storage area for storing a shared object that is shared among a plurality of processes: computer program instructions for specifying one of the plurality of division areas used for read/write processing in accordance with user identification information for identifying a user: and computer program instructions for executing read processing for reading information from a specified division area or write processing for writing information to the specified division area.

One embodiment is a shared object control system for controlling information read/write processing. The system includes an assignment unit for assigning a plurality of division areas to a shared storage area for storing the shared object: an area specifying unit for specifying a division area used for read/write processing in accordance with user identification information for identifying a user; and a read/write execution unit for executing read processing for reading information from a specified division area and write processing for writing information to the division area.

The foregoing and other objects, features and advantages of the disclosure will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
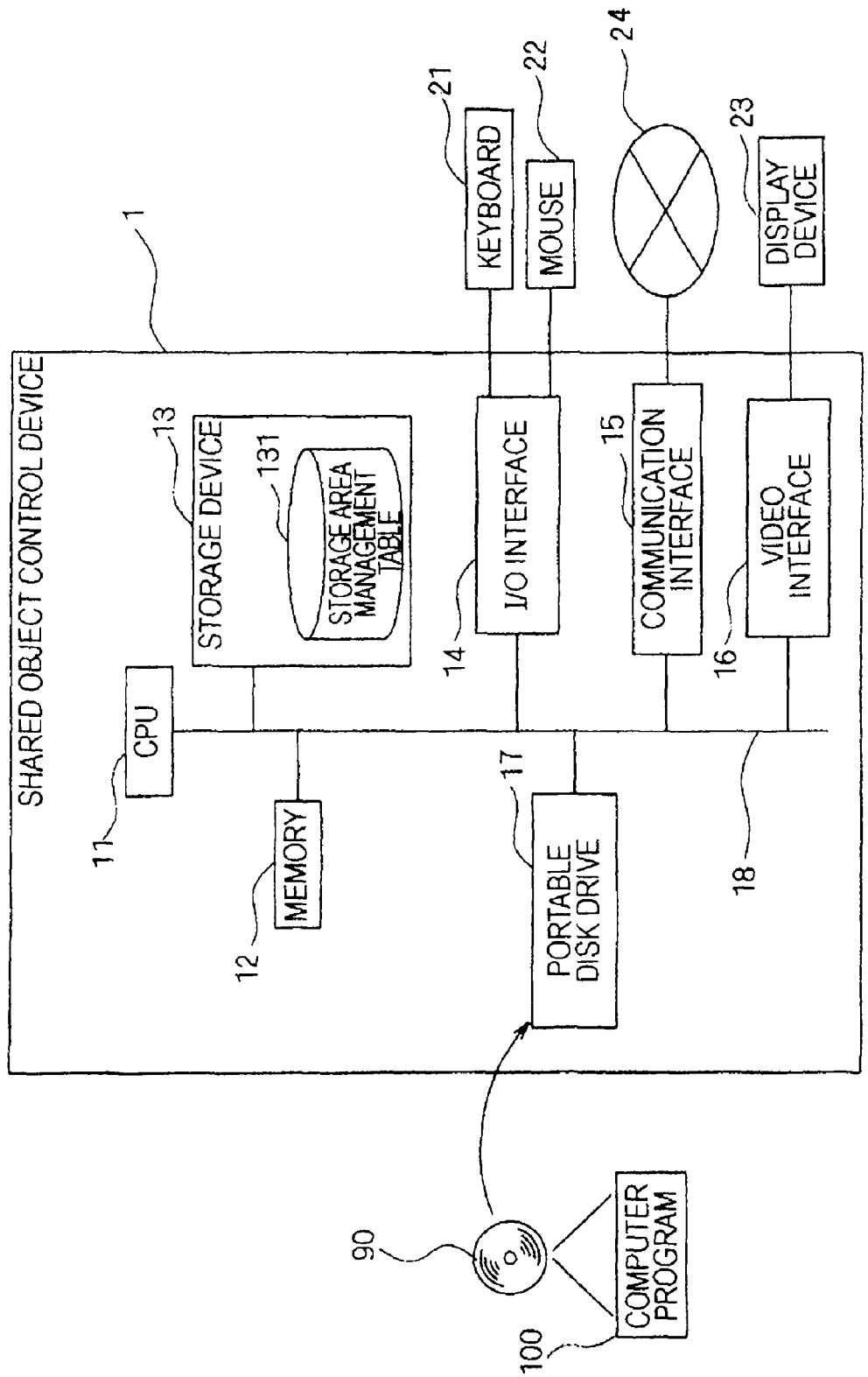
FIG. 1 is a block diagram showing a shared object control device according to an embodiment of the present invention.

Embodiments of the present invention include a computer program product, a control device, and a control method which allow any application to safely use a shared object while maintaining a predetermined security level. It should be noted that the following detailed embodiments are for illustration and not limitation. The present invention can be embodied in other forms and should not be construed as being limited to the embodiments provided herein. The same components are denoted by identical reference numerals throughout the embodiments.

The following embodiments of the present invention illustrate shared object control devices implemented by installing a computer program product to a computer system. However, those skilled in the art could understand that the present invention can be embodied as a computer program product executable on a computer. Accordingly, the present invention can be embodied in the form of hardware as a shared object control device, software, or a combination of software and hardware. The computer program product can be recorded on a recording medium readable with any computer, such as a hard disk, a DVD, a CD, an optical storage device, or a magnetic storage device.

In one embodiment, the system assigns a plurality of division areas to a shared storage area for storing the shared object. A division area used for read/write processing may be specified in accordance with user identification information for identifying a user, and read processing for reading information from a specified division area and write processing for writing information to the division area may be executed. The system may specify division areas used for read/write processing in accordance with user identification information to thereby assign a shared object to division areas that permit a predetermined user to write data thereto or read data therefrom to execute information read/write processing through the shared object. In this way, a shared object can be used at any address different from the standard address without loss of functionality, and leakage of information may be prevented under such conditions that a plurality of applications may access the shared object at the same time.

In one embodiment, the system may prepare a storage area management table for storing pointer information for each of the division areas in association with user identification information. If a user issues an instruction to execute read processing or write processing through a shared object, the system may extract pointer information with reference to the storage area management table with user identification information of the user being used as key information. The system may convert address information representing a target of read processing or write processing into the extracted pointer information. Thus, pointer information may be extracted based on user identification information of a user who issued an instruction to execute read processing or write processing, and address information is converted to an address different from an address that is generally accessed as a shared storage area to thereby limit accesses to a shared object from an indefinite number of applications. Here, the term "pointer information" means address information necessary to access a division area such as a start address of a target user defined area.

In one embodiment, the system may assign a plurality of division areas in accordance with security level information. Information stored in each of the division areas may be encoded with encryption key information specific to each of the division areas to thereby enable the system to access to each of the division areas in accordance with the security level information on the basis of user identification information. Encoding the information with the encryption key information in accordance with the security level information may reduce the possibility of information leakage to an unspecified third party. In addition, or in the alternative, common security level information may be used for a set of plural user identification information. Thus, it is possible to execute information read/write processing through a shared object specified for a particular group.

In one embodiment, the shared object may be a temporary storage area of information shared among plural applications, such as, for example, "clipboard", "window message" or other such operating system (OS) functions of Microsoft Windows (registered trademark). Hence, while a user may be allowed to access a predetermined address under control of the OS, information can be written/read to/from predetermined division areas that are divided in accordance with user identification information and security level information. In another embodiment, the system may assign a plurality of division areas to a temporary storage area shared among plural applications in accordance with security level information, and pointer information for each of the division areas and encryption key information may be stored in association with user identification information and security level information.

If a user issues an instruction to execute read processing or write processing through the temporary storage area, the system may extract pointer information with reference to a storage area management table, with user identification information of the user being used as key information. The system may convert address information representing a target of read processing or write processing into the extracted pointer information to execute read processing for reading information from a target division area or write processing for writing information to a target division area based on the converted address information. Thus, the same function as in the temporary storage area can be achieved at an address different from an address of the temporary storage area that is generally accessed from applications through an OS. In addition, information leakage may be prevented under such conditions that the plurality of applications accesses the address at the same time. Further, security level information may be specified based on the extracted pointer information. The system may encode information to be written (or decode information to be read) using encryption key information corresponding to specified security level information. Thus, even if information leakage occurs, the information may not be decodable unless encryption key information is used.

FIG. 1 is a block diagram showing a shared object control device according to an embodiment of the present invention. The shared object control device 1 may include at least a CPU (central processing unit) 11, a memory 12, a storage device 13, an I/O interface 14, a communication interface 15, a video interface 16, a portable disk drive 17, and an internal bus 18 connecting these hardware components.

The CPU 11 may be connected to the above hardware components of the shared object control device 1 through the internal bus 18 and used to control operations of the above hardware components and also perform various software functions in accordance with a computer program 100 stored in the storage device 13. The memory 12 may be a volatile memory such as an SRAM or an SDRAM. Its load module may be started upon execution of the computer program 100 to store temporary data and the like generated upon the execution of the computer program 100. Further, a predetermined area thereof may function as a shared memory, storing information sharable among plural applications as well. In the following description, the memory serving as a shared memory is also denoted by the same reference numeral.

The communication interface 15 is connected to the internal bus 18 and allowed to transmit/receive data to/from an external computer, etc., when connected to the external network 24 such as the Internet, a LAN, or a WAN. The I/O interface 14 is connected to a keyboard 21, a mouse 22, or other such data input devices and used to accept input of data. Further, the video interface 16 is connected to a display device 23 such as a CRT monitor or an LCD and used to display a predetermined image.

The storage device 13 may include an incorporated fixed storage device (hard disk) and a ROM. The computer program 100 stored in the storage device 13 may be downloaded with the portable disk drive 17 from a portable recording medium 90 that records information such as programs or data, such as a DVD or a CD-ROM and then opened on the memory 12 from the storage device 13 during execution. In this way, the program may be executed. The computer program may also be downloaded from an external computer connected to a network 24 through the communication interface 15.

The storage device 13 may further include a storage area management table 131 storing pointer information for each of a plurality of division areas assigned to a shared object. For example, "clipboard" or "window message" of Microsoft Windows (registered trademark) OS is a temporary storage area of data shared among plural applications, in association with user identification information. Here, the term "division area" means one of a plurality of small areas assigned to a temporary storage area: in other words, areas that can be freely set depending on user definition, aside from the temporary storage area that is generally accessed from applications through an OS.

Figure 2:
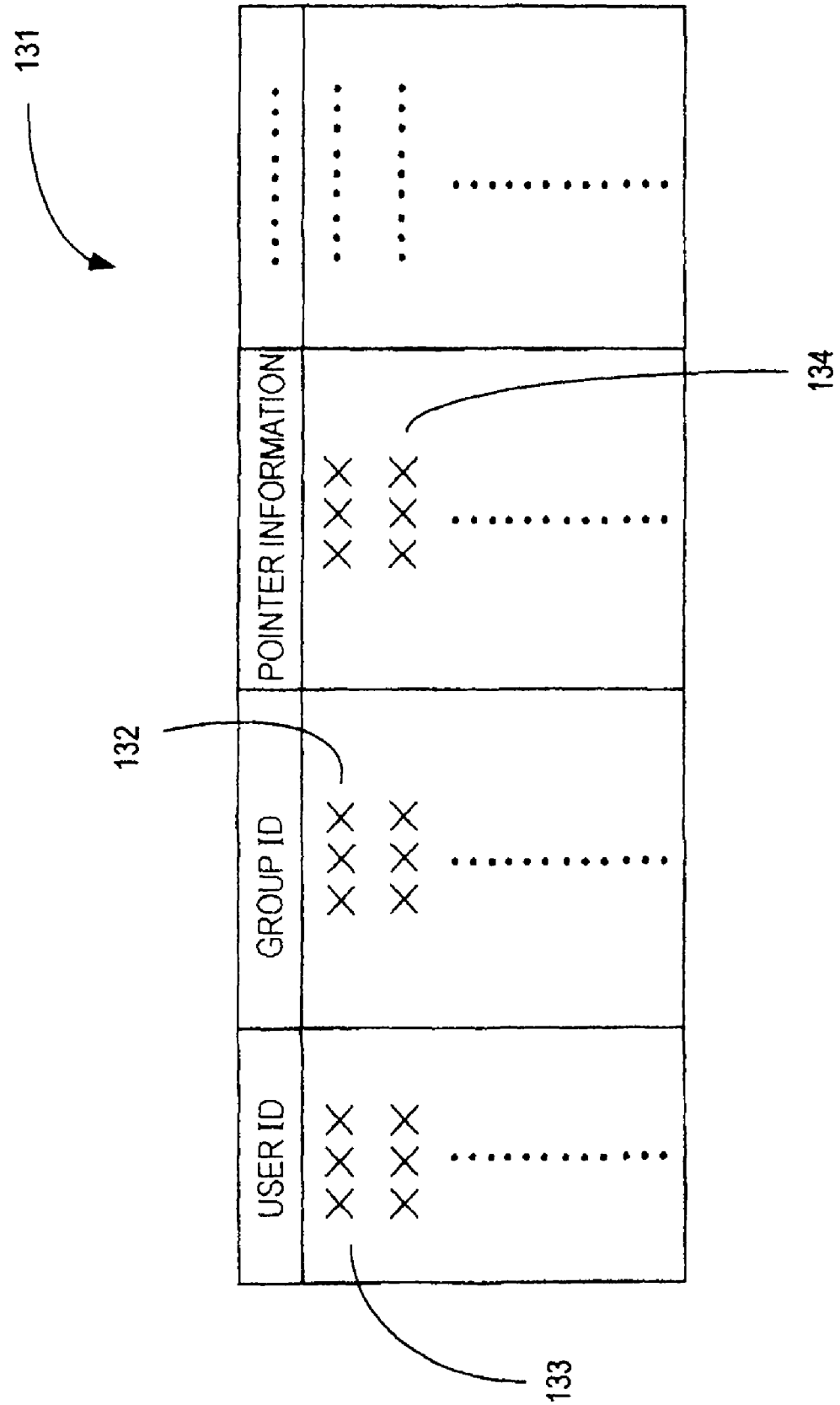
FIG. 2 illustrates the storage area management table according to an embodiment of the present invention.

FIG. 2 illustrates the storage area management table 131 according to an embodiment of the present invention. As shown in FIG. 2, the storage area management table 131 may store pointer information 134 representing a start address of a division area to be accessed in association with a user ID 133 as user identification information for identifying a user. Further, the table may store pointer information in association with a group ID 132 as identification information for identifying a group including one or more users.

Figure 3:
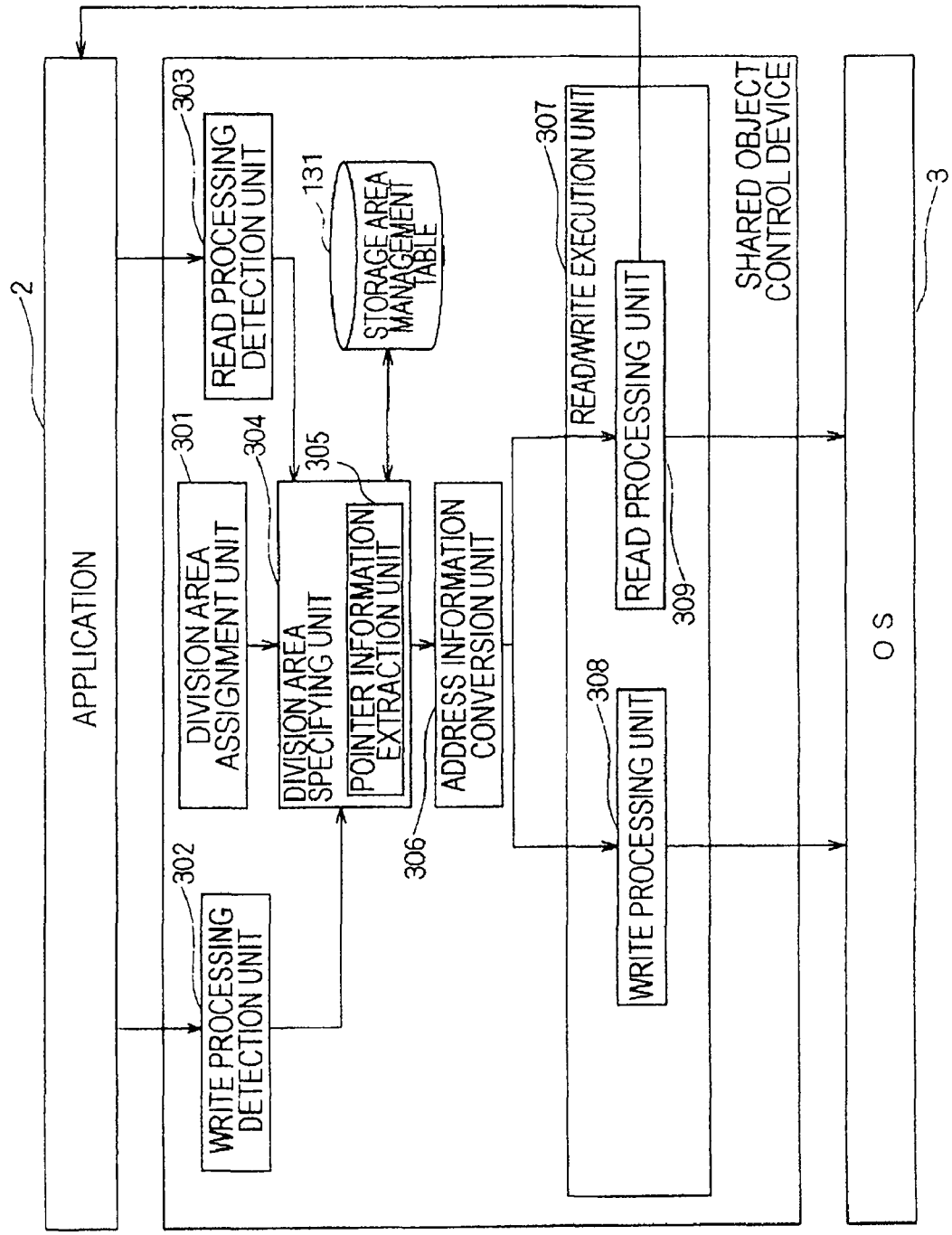
FIG. 3 is a software architecture diagram according to an embodiment of the present invention.

FIG. 3 is a software architecture diagram according to an embodiment of the invention. A division area assignment unit 301 may assign a plurality of division areas to a shared storage area for storing a shared object. In general, an area reserved as a shared memory in the memory 12 is divided into a plurality of areas. An application 2 generally accesses one division area through an OS 3, and after the completion of user definitions, can access the other division areas.

A write processing detection unit 302 may detect write processing performed to write information with the application 2 through a shared object. A read processing detection unit 303 may detect read processing performed to read information with the application 2 through a shared object. A division area specifying unit 304 may determine which of assigned division areas is used for read/write processing, in accordance with user identification information for identifying a user. The division area specifying unit 304 specifies a division area with reference to the storage area management table 131.

A pointer information extraction unit 305 may extract, if the write processing detection unit 302 or the read processing detection unit 303 detects write processing or read processing (respectively) performed through a shared object, pointer information using user identification information of a user who issued an instruction to execute the read processing or the write processing, as key information, with reference to the storage area management table 131.

The address information conversion unit 306 may convert address information as a target of the read processing or write processing into the extracted pointer information. As a result, the application 2 can change an access point from an access to a particular address determined as a standard address through the OS 3 to an access to a user-defined specific division area.

A read/write execution unit 307 may execute read processing for reading information from a division area and write processing for writing information to the division area using the converted address information. More specifically, a write processing unit 308 writes information to a division area using the converted address information, and a read processing unit 309 reads information from a division area using the converted address information.

Figure 4:
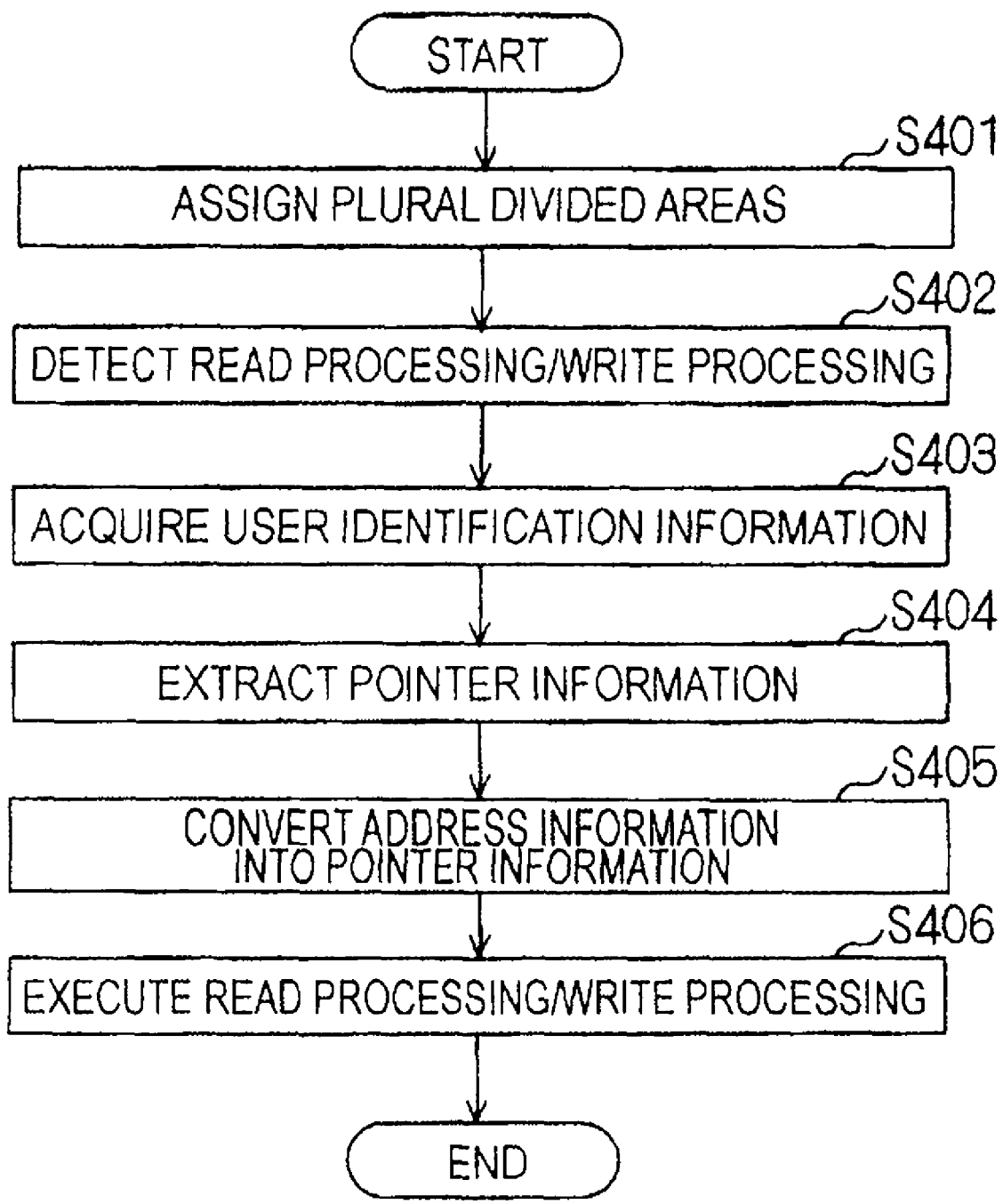
FIG. 4 is a How chart showing a processing procedure according to an embodiment of the present invention.

FIG. 4 is a flowchart showing a processing procedure according to embodiments of the present invention. The processing procedure may be implemented as a processing flow in a system, such as the shared object control device 1 configured as described above. The CPU 11 of the shared object control device 1 may assign plural division areas to a shared storage area that stores a shared object (step S401). For example, if the OS 3 is Microsoft Windows (registered trademark), the shared object may be a temporary storage area such as "clipboard" or "window message."

Figure 5:
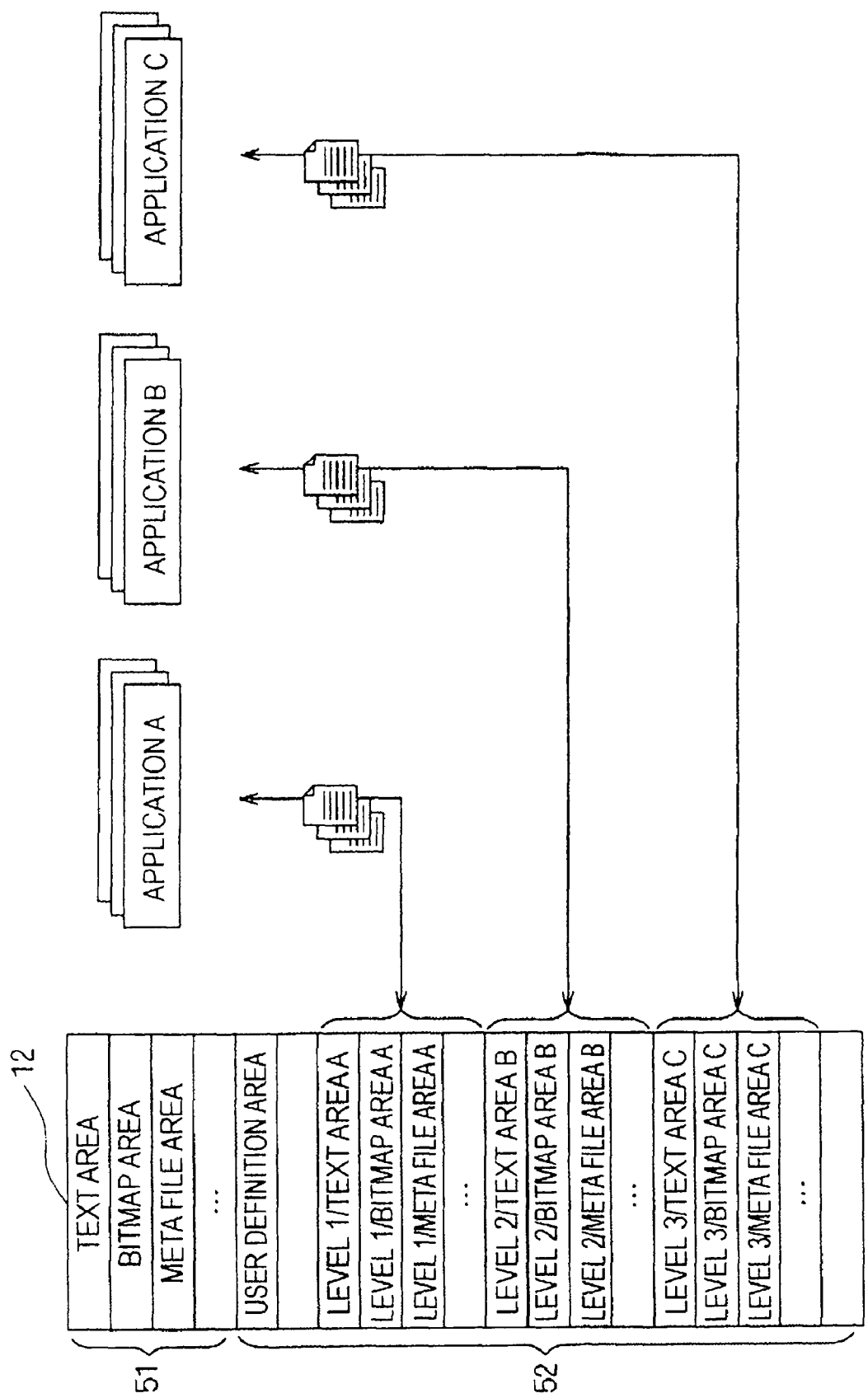
FIG. 5 is a dataflow diagram of the temporary storage area according to an embodiment of the present invention.

FIG. 5 is a dataflow diagram of the temporary storage area in the case of using "clipboard" according to an embodiment of the present invention. In general, an address which the application 2 accesses through the OS 3 is a start address of a standard format area 51 as a shared storage area of the memory 12, and the standard format area 51 is divided into a text area for storing text data, a bitmap area for storing bitmap data, a metafile area for storing a metafile, and the like.

In contrast thereto, in one embodiment, user-defined areas 52 are individually assigned for each application, each user, or each user group such that some areas corresponding to the user-defined areas 52 in a group A are assigned to an application A and some areas corresponding to the user-defined areas 52 in a group B are assigned to an application B.

Referring back to FIG. 4, the CPU 11 of the shared object control device 1 may detect read processing performed to read information with the application 2 through a shared object or write processing performed to write information with the application 2 through a shared object (step S402). The CPU 11 acquires user identification information of a user who issued an instruction to execute the read processing or write processing (step S403) and determines which of plural assigned division areas is used for the read/write processing.

Specifically, the CPU 11 may reference the storage area management table 131 to extract pointer information of a corresponding division area using the acquired user identification information, user ID, as key information (S404). Here, the term "pointer information" means address information necessary to access a division area such as a start address of a division area as a target user-defined area 52. Any information that allows such an access may be used as the pointer information without any limitation. The key information is not limited to the user ID but may be a group ID for identifying a group of plural users or an application ID for identifying an application.

The system converts address information representing a target of read processing or write processing into the extracted pointer information (step S405). As a result, in the case of using "clipboard", although the application 2 generally accesses the standard format area 51 given a specified particular address through the OS 3 to execute read processing or write processing, the address is converted to change a destination to any of the user-defined areas 52 as user-defined specific division areas to execute read processing or write processing. Accordingly, the read processing or write processing can be executed using a temporary storage area unique to each user, and an unspecified third party cannot obtain information in the temporary storage area.

The CPU 11 executes read processing to read information from a division area and write processing to write information to the division area using the converted address information (step S406). To elaborate, the CPU writes information to a division area represented by the converted address information, the user-defined area 52, and reads information from a division area represented by the converted address information, the user-defined area 52.

As described above, according to an embodiment, division areas as a target of read/write processing are specified in accordance with user identification information to thereby assign a shared object to a division area that allows only a predetermined user to read/write information and execute information read processing or write processing through the shared object. Thus, a shared object can be used at any address different from the standard address without loss of functionality the shared object had at the standard address, and leakage of information may be prevented under such conditions that plural applications access the shared object at the same time.

In another embodiment, division areas are assigned in accordance with a security level. The security level information about a security level refers to any information representing the degree of confidentiality for security information regarding security. In order to specify a division area to be assigned in accordance with a security level, security level information may be stored in the storage area management table 131.

Figure 6:
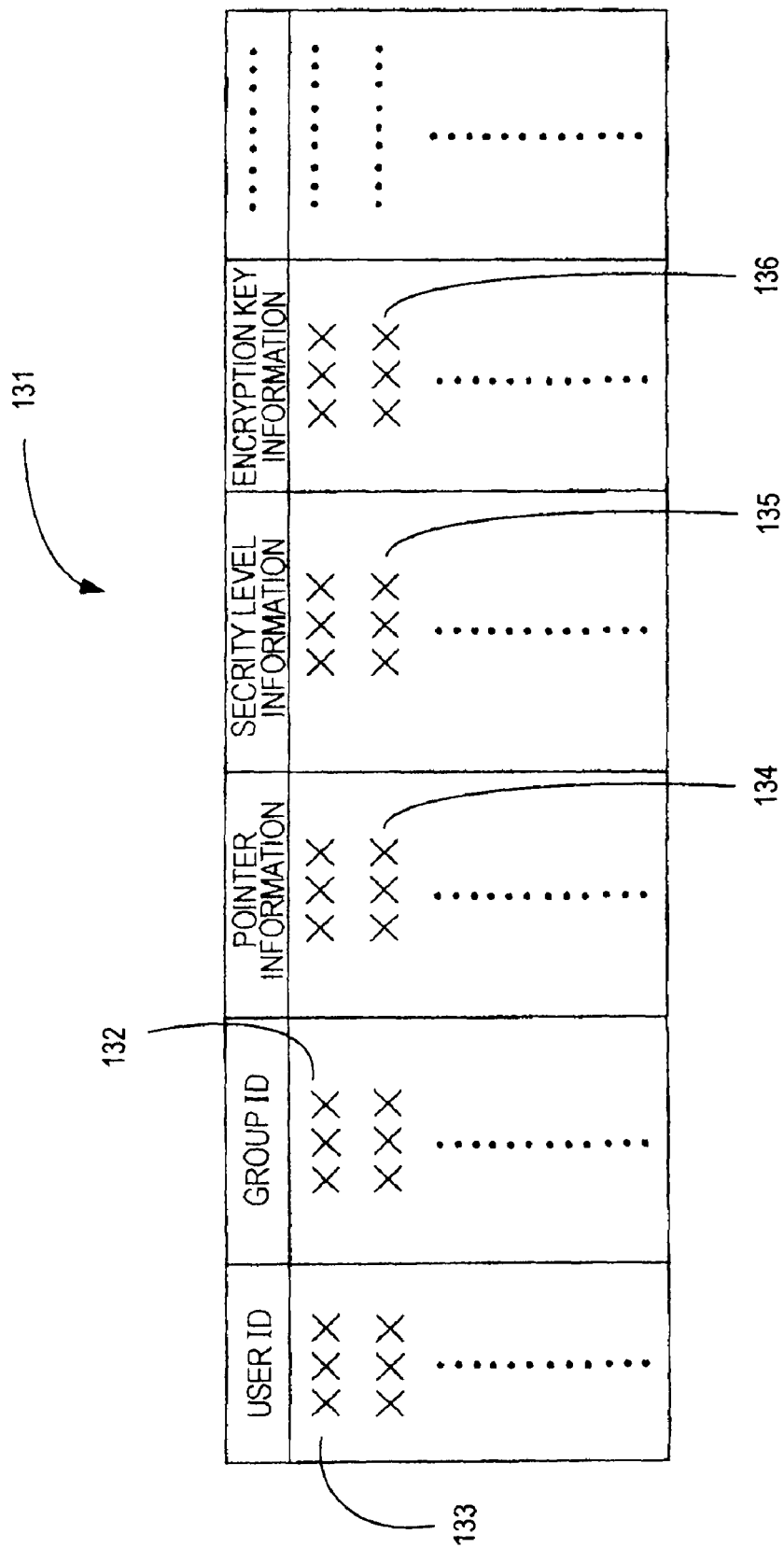
FIG. 6 illustrates the storage area management table according to another embodiment of the present invention.

FIG. 6 illustrates the storage area management table 131 according to another embodiment of the present invention. As shown in FIG. 6, the storage area management table 131 stores pointer information 134 representing a start address of a target division area in association with a user ID 133 as user identification information for identifying a user. Further, the table may store pointer information in association with a group ID 132 as identification information for identifying a group including a plurality of users.

Further, the table stores security level information 135 representing the degree of confidentiality and encryption key information 136 corresponding to the security level information 135 in association with a user ID 133 or a group ID 132. The system may extract encryption key information necessary for a user who issued an instruction to execute read/write processing through a shared object.

Figure 7:
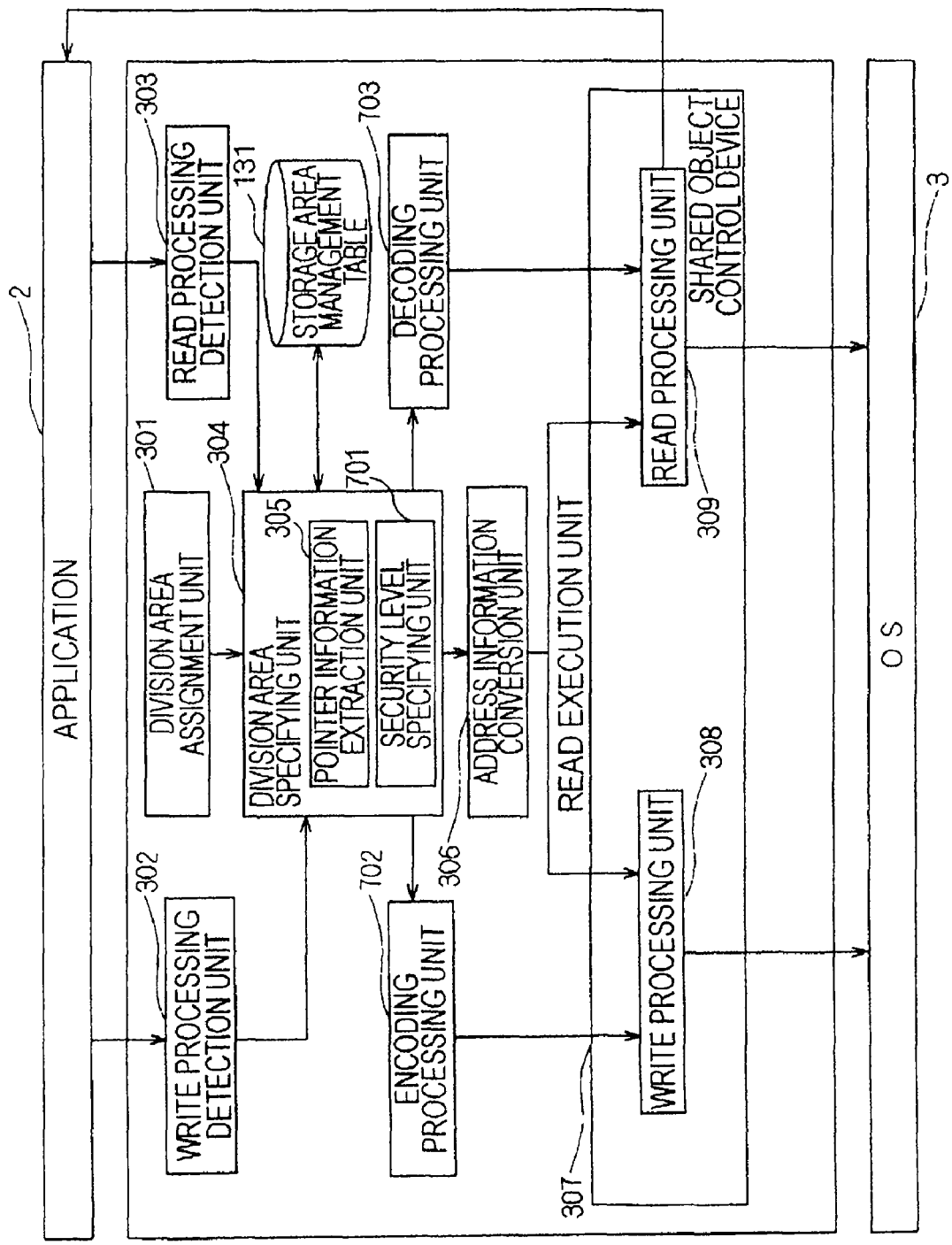
FIG. 7 is a software architecture diagram according to another embodiment of the invention

FIG. 7 is a software architecture diagram according to another embodiment of the invention. The division area assignment unit 301 may assign plural division areas to a shared storage area that stores a shared object. In general, an area reserved as a shared memory in the memory 12 may be divided into a plurality of areas, and the application 2 may access one division area through the OS 3. However, after the completion of user definition, the application may access the other division areas.

A write processing detection unit 302 may detect write processing performed to write information with the application 2 through a shared object. A read processing detection unit 303 may detect read processing performed to read information with the application 2 through a shared object. A division area specifying unit 304 may determine which of assigned division areas is used for read/write processing, in accordance with user identification information for identifying a user. The division area specifying unit 304 specifies a division area with reference to the storage area management table 131.

A security level specifying unit 701 may extract, if the write processing detection unit 302 or the read processing detection unit 303 detects write processing or read processing (respectively) performed through a shared object, security level information and encryption key information using user identification information of a user who issued an instruction to execute the read processing or the write processing, as key information, with reference to the storage area management table 131.

A pointer information extraction unit 305 may extract, if the write processing detection unit 302 or the read processing detection unit 303 detects write processing or read processing (respectively) performed through a shared object, pointer information using user identification information of a user who issued an instruction to execute the read processing or the write processing, as key information, with reference to the storage area management table 131.

The address information conversion unit 306 may convert address information as a target of the read processing or write processing into the extracted pointer information. As a result, the application 2 can change an access point from an access to a particular address determined as a standard address through the OS 3 to an access to a user-defined specific division area in accordance with a security level.

An encoding processing unit 702 may encode information to be written through a shared object using the encryption key information extracted with the security level specifying unit 701. A decoding processing unit 703 may decode information read through the shared object using the encryption key information extracted with the security level specifying unit 701.

A read/write execution unit 307 may execute read processing for reading information from a division area and write processing for writing information to the division area using the converted address information. More specifically, a write processing unit 308 writes information to a division area using the converted address information, and a read processing unit 309 reads information from a division area using the converted address information.

Figure 8:
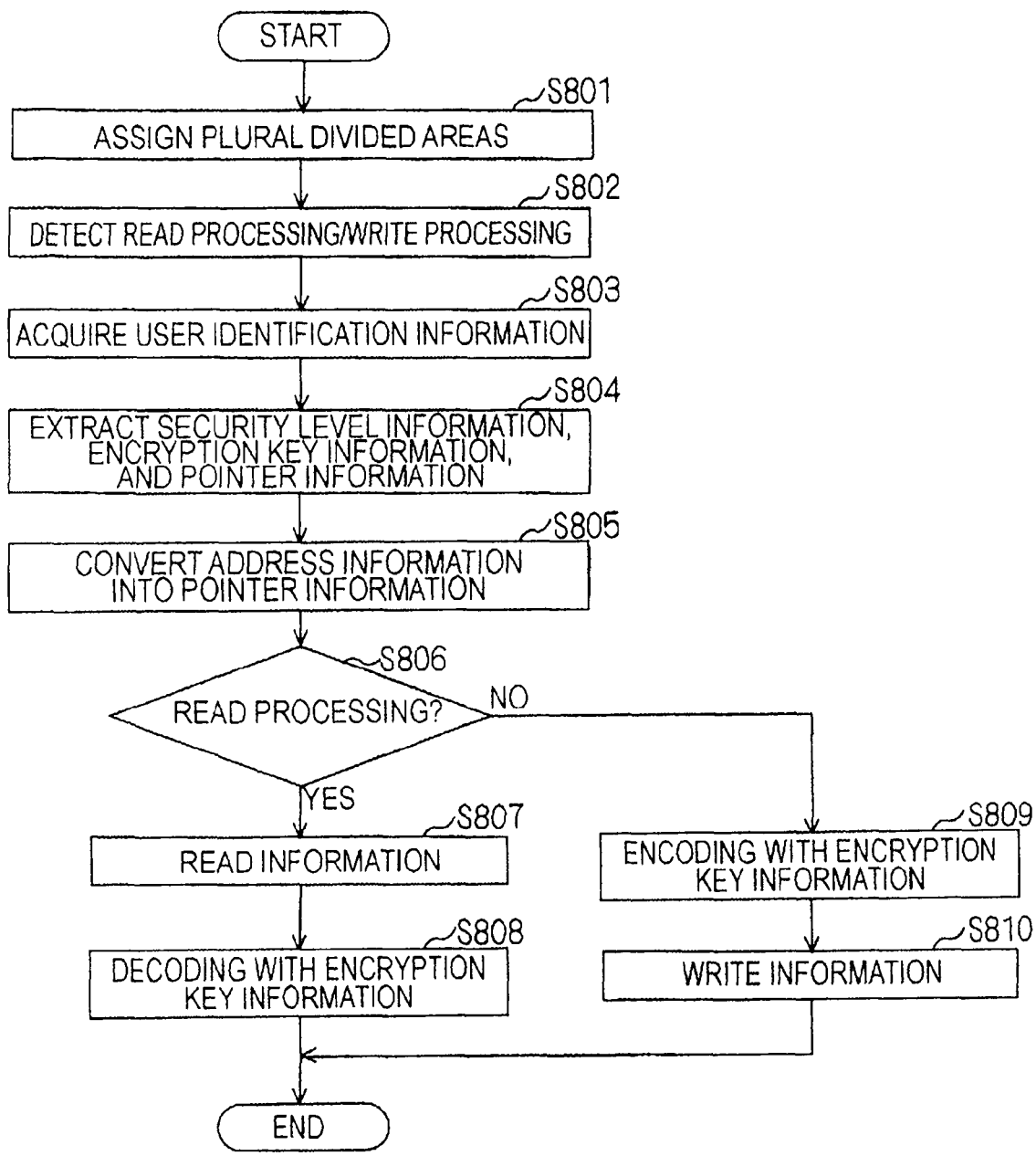
FIG. 8 is a flowchart showing a processing procedure in another embodiment according to the present invention.

FIG. 8 is a flowchart showing a processing procedure in another embodiment according to the present invention. The processing procedure may be implemented as a processing flow in a system, such as the shared object control device 1 configured as described above. The CPU 11 of the shared object control device 1 may assign plural division areas to a shared storage area that stores a shared object (step S801). For example, if the OS 3 is Microsoft Windows (registered trademark), the shared object may be a temporary storage area such as "clipboard" or "window message."

Figure 9:
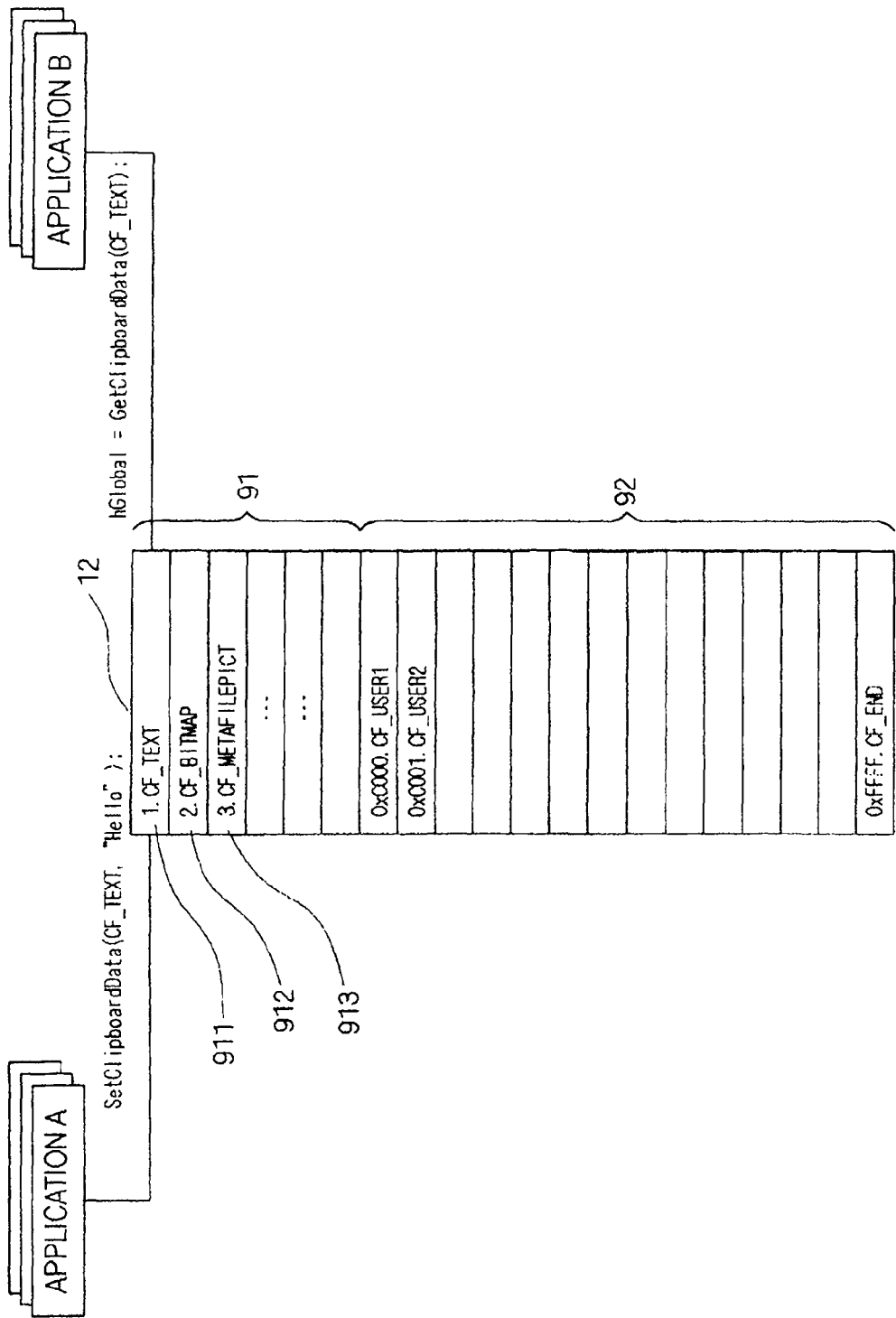
FIG. 9 illustrates message exchange according to an embodiment of the present invention.

FIG. 9 illustrates message exchange in the case of using "clipboard". In general, an address which the application 2 accesses through the OS 3 is a start address of a standard format area 91 as a shared storage area of the memory 12, and the standard format area 91 is divided into a text area 911 for storing text data, a bitmap area 912 for storing bitmap data, a metafile area 913 for storing a metafile, and the like. The application cannot directly access a user-defined area 92. For example, in the case of writing text data "Hello" to the clipboard as illustrated in an application A, a start address of the text area 911 is clearly designated like "CF_TEXT". Further, also in the case of reading text data from the text area 911 on the clipboard as illustrated in an application B, a start address of the text area 911 is clearly designated like "CF_TEXT".

In other embodiments, user-defined areas 92, 92, . . . , are individually assigned, and the areas are assigned in accordance with a security level L. In other words, the user-defined areas 92 are assigned such that user-defined areas 52 corresponding to a security level L1 are assigned for information having the security level L1 and user-defined areas 52 corresponding to a security level L2 are assigned for information having the security level L2.

Referring back to FIG. 8, the CPU 11 of the shared object control device 1 may detect read processing performed to read information with the application 2 through a shared object or write processing performed to write information with the application 2 through a shared object (step S802). The CPU 11 may acquire user identification information of a user who issued an instruction to execute the read processing or write processing (step S803) and determines which of plural assigned division areas is used for the read/write processing.

Specifically, the CPU 11 may reference the storage area management table 131 to extract pointer information of a corresponding division area as well as security level information and encryption key information for the user by using the acquired user identification information, user ID, as key information (S804). The storage area management table 131 is not limited to the data structure illustrated in FIG. 6 but may be structured to include a table storing a user ID and security level information in association with each other and a table storing security level information and pointer information in association with each other. In this case, security level information may be specified based on an acquired user ID, and pointer information of a target temporary storage area may be acquired based on the specified security level information.

The CPU 11 may convert address information representing a target of read processing or write processing into the extracted pointer information (step S805). As a result, in the case of using "clipboard", although the application 2 generally accesses the standard format area 91 given a specified particular address through the OS 3 to execute read processing or write processing, the address is converted to change a destination to any of the user-defined areas 92 as user-defined specific division areas to execute read processing or write processing. Accordingly, the read processing or write processing may be executed using a temporary storage area unique to each user, and an unspecified third party may not obtain information in the temporary storage area.

The CPU 11 may determine whether read processing is being executed (step S806). If read processing is being executed (step S806: YES), the CPU 11 may read information from a division area specified by the converted address information, that is, the user-defined area 92 (step S807) and decodes the read information with the extracted encryption key information (step S808). If read processing is not being executed (step S806: NO), the CPU 11 may determine that write processing is being executed and encodes information to be written based on the extracted encryption key information (step S809) to write the information to a division area specified by the converted address information, that is, the user-defined area 92 (step S810).

Figure 10:
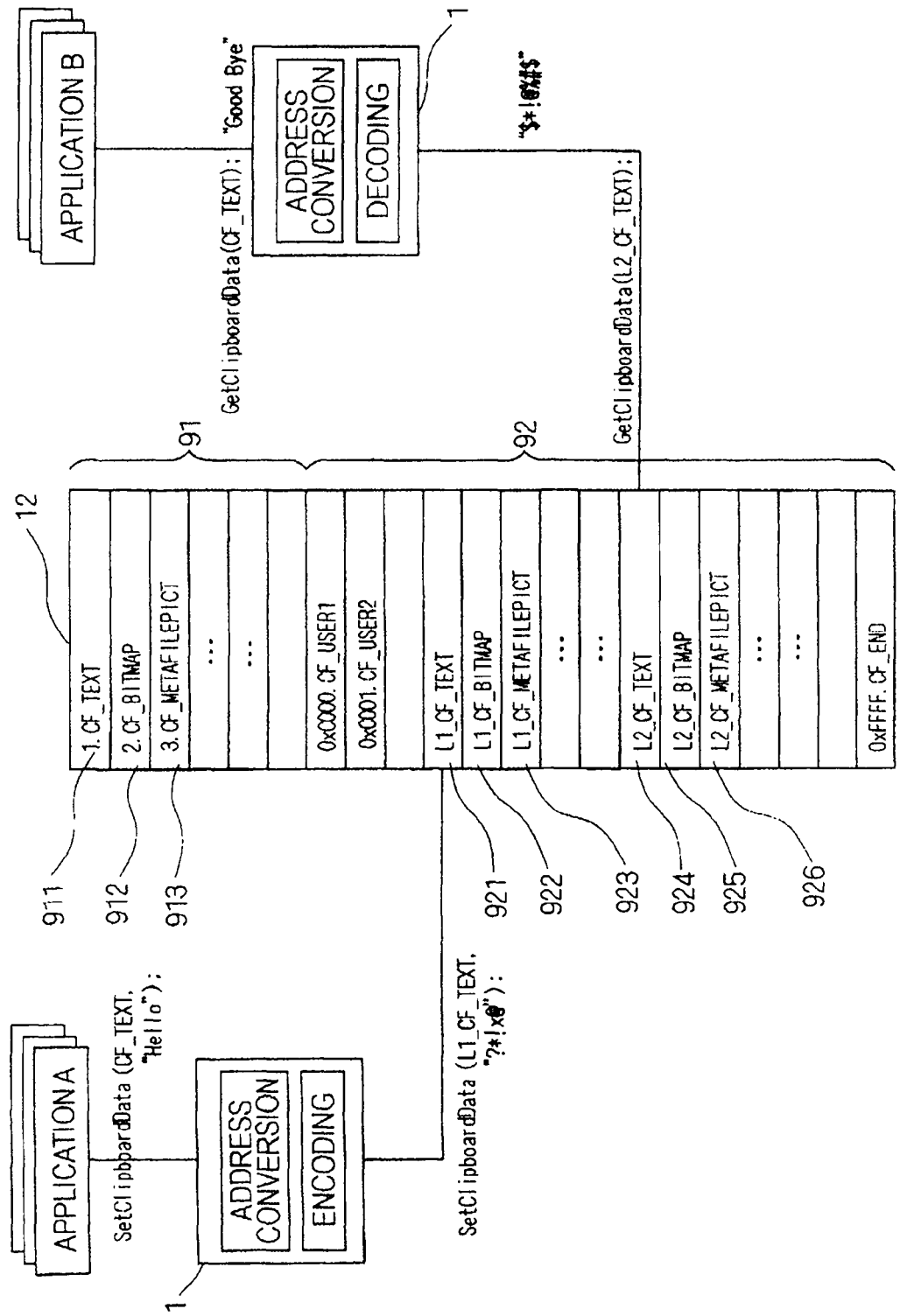
FIG. 10 illustrates data exchange in another embodiment according to the present invention.

FIG. 10 illustrates data exchange in another embodiment according to the present invention. An application A writes text data "Hello" to the clipboard. A write function is similar to that in s standard format, and preset address information is the same as in generally-used clipboard, that is, set to "CF_TEXT".

The shared object control device 1, accepting SetClipboardData as an API (application interface), converts address information to the extracted pointer information to encode information. More specifically, the address information is converted from CF_TEXT indicating the standard format area 91 to L1_CF_TEXT indicating the user-defined area 92, and text data "Hello" is encoded into undecipherable data.

The encoded text data is written to an address indicating the text data area 921 of the user-defined area 92 on the clipboard. At the time of writing the data, the data can be written to the user-defined area 92 assigned in accordance with a user, a security level, or the like only through similar settings to a general API.

An application B reads text data "Good Bye" from the clipboard. A read function is similar to that in standard format, and preset address information is the same as in generally-used clipboard, that is, set to "CF_TEXT". The shared object control device 1, accepting GetClipboardData as an API (application interface), converts address information to the extracted pointer information to read encoded text data from an address indicating a text data area 924 of the user-defined area 92 on the clipboard. More specifically, the address information is converted from CF_TEXT indicating the standard format area 91 to L2_CF_TEXT indicating the user-defined area 92 to read the encoded text data "Good Bye".

The read text data is decoded into the text data "Good Bye" using extracted encryption key information. At the time of reading data, the data can be read from the user-defined area 92 assigned in accordance with a user, a security level, or the like only through similar settings to a general API.

Figure 11:
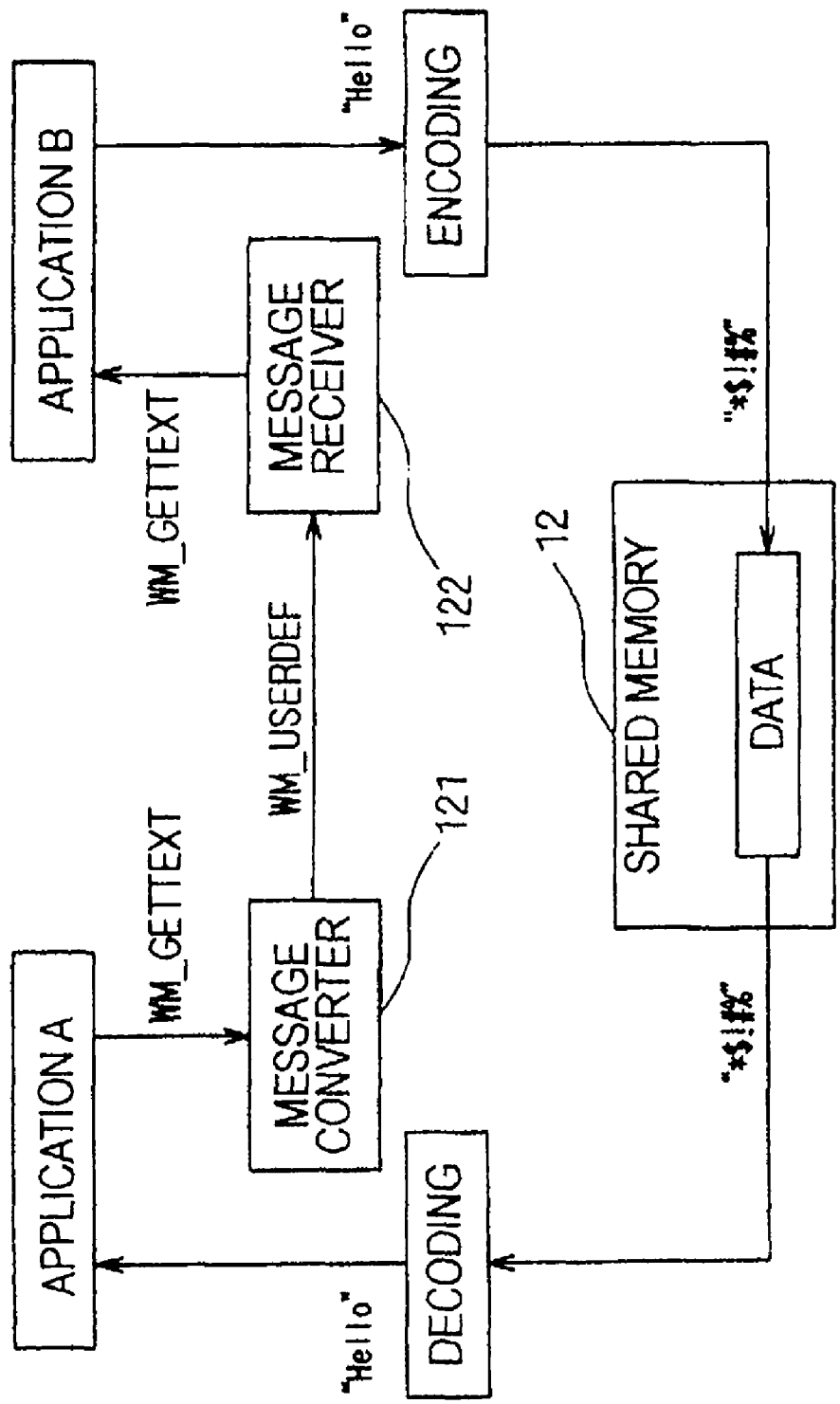
FIG. 11 illustrates data exchange according to an embodiment of the present invention.

FIG. 11 illustrates data exchange according to an embodiment of the present invention. A message converter 121 and a message receiver 122 are provided. As shown in FIG. 11, an application A sends WM_GETTEXT as a standard API to the message converter 121, and an application B receives WM_GETTEXT as a standard API from the message receiver 122. The message converter 121 converts WM_GETTEXT as a standard API to WM_USERDEF as a user-defined message and sends the converted one to the message receiver 122.

Thus, an unspecified third party cannot determine which application sends a message exchange request to which application.

When receiving WM_GETTEXT, the application B encodes requested text data "Hello" using encryption key information and sends the encoded one to the shared memory 12. The application A decodes the encoded text data stored in the shared memory 12 based on the encryption key information to obtain the text data "Hello".

As described above, a plurality of division areas are assigned in accordance with security level information, and information stored in each of the division areas is encoded using an encryption key specific to each of the division areas to thereby enable accesses to a target division area in accordance with a security level on the basis of user identification information. In addition, since the information is encoded with an encryption key corresponding to a security level, information is less likely to leak to an unspecified third party.

The present invention is not limited to the above embodiments but can be changed or modified in various forms. For example, "clipboard" or "window message" of Microsoft Windows (registered trademark) is described by way of example, but the shared object is not limited thereto, and similar beneficial effects can be expected in any temporary storage area that can be shared among a plurality of applications. Embodiments of the invention may be implemented as a stand-alone application, as a plug-in for the resource management application (or any equivalent program), or directly embedded within the resource management application. The proposed method may also be carried out on a system with a different architecture or including equivalent units. Software used to implement embodiments of the invention may be structured in various ways and may include alternative modules or functions. Embodiments of the invention may be implemented in any form suitable to be used by or in connection with any data processing system. Moreover, the program may be provided on any computer-readable medium; the medium can be any element suitable to contain, store, communicate, propagate, or transfer the program. Examples of such medium are fixed disks (where the program can be pre-loaded), removable disks, tapes, cards, wires, networks, and the like; for example, the medium may be of the electronic, magnetic, optical, electromagnetic, infrared, or semiconductor type.

It should be understood that the inventive concepts disclosed herein are capable of many modifications. To the extent such modifications fall within the scope of the appended claims and their equivalents, they are intended to be covered by this patent.

What is claimed is:

1. A computer-implemented shared object control method for controlling information read/write processing, the method comprising:

assigning, in accordance with security level information, a plurality of division areas to a shared storage area for storing a shared object, the shared object shared among a plurality of processes;

specifying a division area used for read/write processing in accordance with user identification information for identifying a user, the specifying a division area comprising maintaining a storage area management table for storing pointer information for each of the division areas in association with the user identification information;

executing the read processing for reading information from a specified division area and the write processing for writing information to the specified division area, the executing the read processing or the write processing comprising:

extracting pointer information with reference to the storage area management table with user identification information of the user being used as key information; and converting address information representing a target of the read processing or the write processing into the extracted pointer information;

storing specific encryption key information in accordance with the security level information;

specifying security level information based on the extracted pointer information; and encoding information to be written or decoding read information using the specific encryption key information corresponding to the specified security.

2. The method of claim 1, wherein common security level information is used for a set of a plurality of user identification information.

3. A computer program product for controlling information read/write processing, the computer program product comprising:

a computer-readable medium having computer usable program code embodied therewith, the computer usable program code comprising:

computer program instructions for assigning, in accordance with security level information, a plurality of division areas to a shared storage area for storing a shared object that is shared among a plurality of processes;

computer program instructions for specifying a division area used for read/write processing in accordance with user identification information for identifying a user, the computer program instructions for specifying a division area comprising computer program instructions for maintaining a storage area management table for storing pointer information for each of the division areas in association with the user identification information;

computer program instructions for executing the read processing for reading information from a specified division area and the write processing for writing information to the specified division area, the computer program instructions for executing the read processing or the write processing comprising:

computer program instructions for extracting pointer information with reference to the storage area management table with user identification information of the user being used as key information; and computer program instructions for converting address information representing a target of the read processing or the write processing into the extracted pointer information;

computer program instructions for storing specific encryption key information in accordance with the security level information;

computer program instructions for specifying security level information based on the extracted pointer information; and computer program instructions for encoding information to be written or decoding read information using the specific encryption key information corresponding to specified security level information.

4. The computer program product of claim 3, wherein common security level information is used for a set of a plurality of user identification information.

5. A shared object control system for controlling information read/write processing, the system comprising:

a processor; and
a computer memory operatively coupled to the processor;
the computer memory having disposed therein:
  computer program instructions for assigning, in accordance with security level information, a plurality of division areas to a shared storage area for storing a shared object that is shared among a plurality of processes;
  a storage area management table for storing pointer information for each of the division areas in association with user identification information;
  computer program instructions for specifying a division area used for read/write processing in accordance with user identification information for identifying a user, the computer program instructions for specifying a division area comprising computer program instructions for maintaining the storage area management table;
  computer program instructions for executing the read processing for reading information from a specified division area and the write processing for writing information to the specified division area, the computer program instructions for executing the read processing or the write processing comprising:
    computer program instructions for extracting pointer information with reference to the storage area management table with user identification information of the user being used as key information; and
    computer program instructions for converting address information representing a target of the read processing or the write processing into the extracted pointer information;
  computer program instructions for storing specific encryption key information in accordance with the security level information;
  computer program instructions for specifying security level information based on the extracted pointer information; and
  computer program instructions for encoding information to be written or decoding read information using the specific encryption key information corresponding to specified security level information.

6. The system of claim 5, wherein common security level information is used for a set of a plurality of user identification information.

7. The system of claim 5, the computer memory having disposed therein computer program instructions for creation during execution of the computer program instructions of:
  an assignment unit for assigning a plurality of division areas to a shared storage area for storing the shared object;
  an area specifying unit for specifying a division area used for read/write processing in accordance with user identification information for identifying a user; and
  a read/write execution unit for executing read processing for reading information from a specified division area and write processing for writing information to the division area.

8. The system of claim 7, the computer memory having further disposed therein computer program instructions for creation during execution of the computer program instructions of:
  an extraction unit for extracting, if a user issues an instruction to execute read processing or write processing through a shared object, pointer information with reference to the storage area management table with user identification information of the user being used as key information; and
  a conversion unit for converting address information representing a target of read processing or write processing into the extracted pointer information.

9. A computer-implemented shared object control method for controlling information read/write processing, the method comprising:
  assigning, in accordance with security level information, a plurality of division areas to a shared storage area for storing a shared object, wherein the shared object is a temporary storage area of information that is shared among a plurality of applications;
  specifying a division area used for read/write processing in accordance with user identification information for identifying a user, the specifying a division area comprising maintaining a storage area management table for storing pointer information for each of the division areas and encryption key information in association with the user identification information and the security level information; and
  executing the read processing for reading information from a specified division area and the write processing for writing information to the specified division area, the executing the read processing or the write processing comprising:
    extracting pointer information with reference to the storage area management table with user identification information of the user being used as key information if a user issues an instruction to execute, through the temporary storage area, the read processing or the write processing;
    converting address information representing a target of the read processing or the write processing into the extracted pointer information; specifying security level information based on the extracted pointer information; and
    encoding information to be written or decoding read information using the encryption key information corresponding to the specified security level information,
  wherein executing the read processing and the write processing is carried out in dependence upon the converted address information.

10. A computer program product for controlling information read/write processing, the computer program product comprising:
  a computer-readable medium having computer usable program code embodied therewith, the computer usable program code comprising:
    computer program instructions for assigning, in accordance with security level information, a plurality of division areas to a shared storage area for storing a shared object, wherein the shared object is a temporary storage area of information shared among a plurality of applications;
    computer program instructions for specifying a division area used for read/write processing in accordance with user identification information for identifying a user, the computer program instructions for specifying a division area comprising computer program instructions for maintaining a storage area management table for storing pointer information for each of the division areas and encryption key information in association with the user identification information and the security level information; and
    computer program instructions for executing the read processing for reading information from a specified division area and the write processing for writing information to the specified division area, the computer program instructions for executing the read processing or the write processing comprising:
   computer program instructions for extracting pointer information with reference to the storage area management table with user identification information of the user being used as key information if a user issues an instruction to execute, through the temporary storage area, the read processing or the write processing;
   computer program instructions for converting address information representing a target of the read processing or the write processing into the extracted pointer information;
   computer program instructions for specifying security level information based on the extracted pointer information; and
   computer program instructions for encoding information to be written or decoding read information using the encryption key information corresponding to the specified security level information,
   wherein computer program instructions for executing the read processing and the write processing comprise computer program instructions for executing the read processing and the write processing in dependence upon the converted address information.

11. A shared object control system for controlling information read/write processing, the system comprising:
   a processor; and
   a computer memory operatively coupled to the processor; the computer memory having disposed therein:
   computer program instructions for assigning, in accordance with security level information, a plurality of division areas to a shared storage area for storing a shared object, wherein the shared object is a temporary storage area of information shared among a plurality of applications;
   computer program instructions for specifying a division area used for read/write processing in accordance with user identification information for identifying a user, the computer program instructions for specifying a division area comprising computer program instructions for maintaining a storage area management table for storing pointer information for each of the division areas and encryption key information in association with the user identification information and the security level information; and
   computer program instructions for executing the read processing for reading information from a specified division area and the write processing for writing information to the specified division area, the computer program instructions for executing the read processing or the write processing comprising:
      computer program instructions for extracting pointer information with reference to the storage area management table with user identification information of the user being used as key information if a user issues an instruction to execute, through the temporary storage area, the read processing or the write processing;
      computer program instructions for converting address information representing a target of the read processing or the write processing into the extracted pointer information;
      computer program instructions for specifying security level information based on the extracted pointer information; and
      computer program instructions for encoding information to be written or decoding read information using the encryption key information corresponding to the specified security level information,
   wherein the computer program instructions for executing the read processing and the write processing comprise computer program instructions for executing the read processing and the write processing in dependence upon the converted address information.

* * * * *